(12) United States Patent
Naron et al.

(10) Patent No.: US 10,088,118 B2
(45) Date of Patent: Oct. 2, 2018

(54) LIGHT EMITTING AREA EXTENDER

(71) Applicant: HELLA GmbH & Co. KGaA, Lippstadt (DE)

(72) Inventors: Bijoy Naron, Northville, MI (US); José Miguel Mercado Peña, Canton, MI (US); Tiffany Christina Bosscher, Farmington Hills, MI (US); Sandy Szczepanski, Ypsilanti, MI (US); Mirco Götz, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 59 days.

(21) Appl. No.: 15/251,549

(22) Filed: Aug. 30, 2016

(65) Prior Publication Data

US 2018/0058656 A1  Mar. 1, 2018

(51) Int. Cl.
*F21S 43/14* (2018.01)
*F21S 43/236* (2018.01)
(Continued)

(52) U.S. Cl.
CPC .............. *F21S 43/14* (2018.01); *F21S 43/145* (2018.01); *F21S 43/19* (2018.01); *F21S 43/236* (2018.01); *F21S 43/239* (2018.01); *F21S 43/241* (2018.01); *F21S 43/243* (2018.01); *F21S 43/249* (2018.01); *F21S 43/315* (2018.01); *F21S 43/40* (2018.01);
(Continued)

(58) Field of Classification Search
None
See application file for complete search history.

(56) References Cited

U.S. PATENT DOCUMENTS 6,356,394 B1 * 3/2002 Glienicke ............... B60Q 3/64
359/641
7,942,565 B2 * 5/2011 Klick ..................... G02B 6/0018
362/555

(Continued)

OTHER PUBLICATIONS

Stop Lamps for Use on Motor Vehicles Less Than 2032 MM in Overall Width—SAE J586, SAE Standard, 2 pgs. (Feb. 1984).

(Continued)

*Primary Examiner* — Britt D Hanley
(74) *Attorney, Agent, or Firm* — Warner Norcross + Judd LLP

(57) ABSTRACT

Lighting device includes a light source and a light guide body that has an in-coupling portion that collects the light, a propagating portion that carries the collected light, and an out-coupling portion, which has a central light emitting portion with a central exterior surface, an extended light emitting portion with a proximal reflecting surface and an extended exterior surface, and a deflecting element. The central light emitting portion guides a first light portion emerging from the propagating portion towards the central exterior surface where it is emitted. The deflecting element guides a second light portion emerging from the propagating portion towards the extended light emitting portion, which reflects the second light portion towards the extended exterior surface where it is also emitted. The central surface generates light to satisfy light distribution standards while the addition of the extended light emitting areas assures that a minimum light emitting area is satisfied.

19 Claims, 7 Drawing Sheets

(51) Int. Cl.
*F21S 43/145* (2018.01)
*F21S 43/31* (2018.01)
*F21S 43/19* (2018.01)
*F21V 8/00* (2006.01)
*F21S 43/239* (2018.01)
*F21S 43/241* (2018.01)
*F21S 43/243* (2018.01)
*F21S 43/249* (2018.01)
*F21S 43/40* (2018.01)
*F21Y 115/10* (2016.01)

(52) U.S. Cl.
CPC ......... *G02B 6/0058* (2013.01); *F21Y 2115/10* (2016.08)

(56) References Cited

U.S. PATENT DOCUMENTS

| | | | |
|---|---|---|---|
| 8,333,493 B2 * | 12/2012 | Taleb-Bendiab | B60Q 1/0035 362/511 |
| 8,920,006 B2 | 12/2014 | de Lamberterie | |
| 9,010,982 B2 | 4/2015 | Kropac et al. | |
| 9,028,120 B2 | 5/2015 | Dau et al. | |
| 9,103,956 B2 | 8/2015 | Nichol et al. | |
| 9,140,422 B2 | 9/2015 | Arrivet et al. | |
| 9,217,821 B2 | 12/2015 | Goto et al. | |
| 9,223,074 B2 | 12/2015 | Kurata | |
| 9,574,734 B2 * | 2/2017 | Sousek | F21S 48/215 |
| 2007/0019429 A1 * | 1/2007 | Gasquet | F21S 48/215 362/510 |
| 2008/0186732 A1 * | 8/2008 | Awai | G02B 6/0031 362/609 |
| 2014/0211493 A1 * | 7/2014 | Ichikawa | F21S 48/2237 362/511 |
| 2016/0053962 A1 * | 2/2016 | Akutsu | B60Q 1/0052 362/511 |
| 2016/0195234 A1 * | 7/2016 | Mateju | A61N 1/0468 362/511 |
| 2016/0245473 A1 * | 8/2016 | Ah | F21S 48/1241 |
| 2017/0097133 A1 * | 4/2017 | Lee | F21S 48/225 |
| 2017/0234501 A1 * | 8/2017 | Hanami | F21S 48/2237 362/511 |
| 2017/0241615 A1 * | 8/2017 | Luo | F21S 48/215 |

OTHER PUBLICATIONS

Turn Signal Lamps for Use on Motor Vehicles Less Than 2032 MM in Overall Width—SAE J588, SAE Standard, 3 pgs. (Dec. 1994).
National Highway Traffic Safety Admin. DOT, CFR 2013, Title 49, vol. 6, Section 571.108 (pp. 333-335 and 402).

* cited by examiner

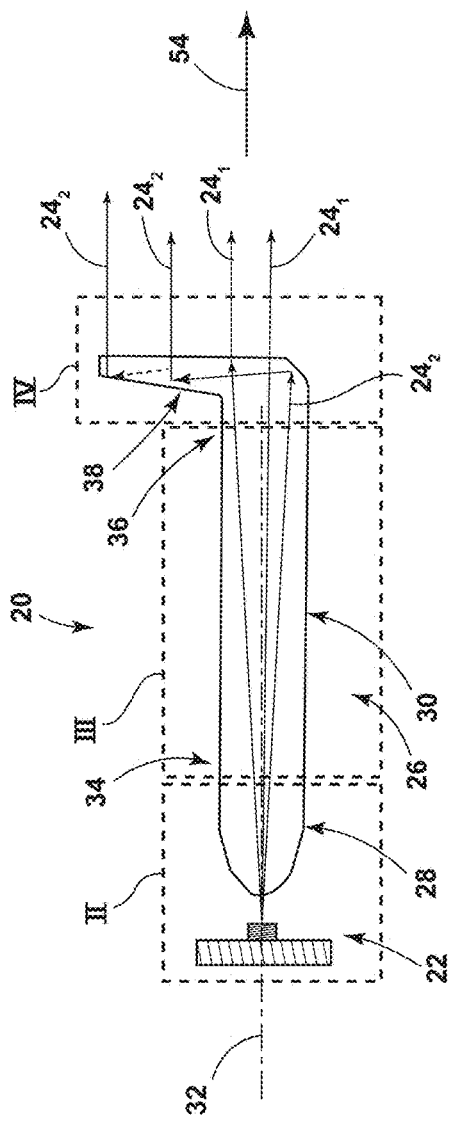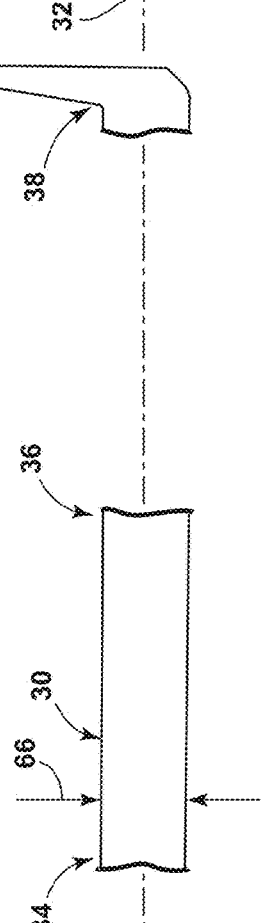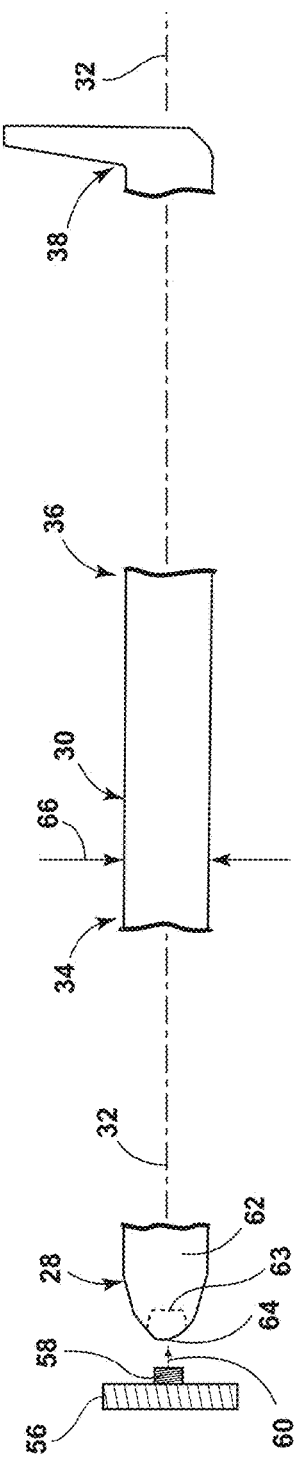
FIG. 1
FIG. 2
FIG. 3
FIG. 4

LIGHT EMITTING AREA EXTENDER

CROSS-REFERENCE TO RELATED APPLICATIONS

Not applicable.

BACKGROUND a. Technical Field

The instant disclosure relates generally to a lighting device, and more particularly to a lighting device for an automotive vehicle.

b. Background

This background description is set forth below for the purpose of providing context only. Therefore, any aspects of this background description, to the extent that it does not otherwise qualify as prior art, is neither expressly nor impliedly admitted as prior art against the instant disclosure.

An exterior lighting device for an automotive vehicle is known in the art, which can be used, for example, to provide a stop signal or a turn signal functions. Additionally, there are various automotive lighting regulations that govern how such lighting devices are designed (e.g., size) and operate (e.g., light intensity). In particular, several automotive lighting regulations define a minimum light emitting area for certain lighting functions. For example, certain automotive lighting regulations (e.g., FMVSS 108 and CMVSS) currently require a light emitting area for stop or turn signal function of at least 50 square centimeters.

In addition, there is a desire to provide lighting functions that are innovative from both a styling and functional point of view. A so-called light-blade or edge-light can meet this desire. However, while a light-blade is capable of meeting lighting regulations in general, a light-blade can be too thin in many instances to meet the above-mentioned minimum light emitting area requirement.

One approach to meet the light emitting area requirement for a light-blade/edge-light would be to increase the thickness of its various sections. However, this results in a heavier, more expensive, and more difficult to produce lighting device.

Accordingly, it would be desirable to provide a lighting device in the form of a light-blade/edge-light that that provides an increased light emitting area.

The foregoing discussion is intended only to illustrate the present field and should not be taken as a disavowal of claim scope.

SUMMARY

In an embodiment, a lighting device is provided suitable for use in an automotive vehicle, and comprising a light source and a light guide body. The light guide body includes an in-coupling portion, a propagating portion, and an out-coupling portion. The in-coupling portion is optically coupled to the light source and is configured to collect light that is output from the light source. The propagating portion extends along a longitudinal axis between a proximal end and a distal end, wherein the propagating portion is configured to receive light from the in-coupling portion at the proximal end and then guide the light to the distal end. The out-coupling portion has a central light emitting portion with a central exterior surface, an extended light emitting portion having a proximal reflecting surface and an extended exterior surface, and a deflecting element.

The central light emitting portion is proximate or next to the distal end of the propagating portion and is configured to guide a first portion of light to the central exterior surface to emit the first portion of light in a first direction. The deflecting element is also proximate the distal end of the propagating portion and is configured to guide a second portion of light that is propagating in the first direction to the proximal reflecting surface of the extended light emitting portion. In turn, the extended light emitting portion guides the second portion of light reflected from the proximal reflecting surface to the extended exterior surface, to thereby emit the second portion of light also in the first direction.

The light emitted from the central exterior surface may be used to generate the light distribution needed to fulfill lighting regulations (e.g., test point values). The area of the central exterior surface defines a first, central light emitting area. The area of the extended exterior surface defines a second, extended light emitting area. The addition of the second, extended light emitting area to the first, central light emitting area assures that the total light emitting area (i.e., the sum of the first and second areas) meets the minimum light emitting area requirements.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 1 is a diagrammatic view of a lighting device in accordance with an embodiment, including a light source and a light guide body.

FIG. 2 is diagrammatic view of the light source and an in-coupling portion of the light guide body of FIG. 1.

FIG. 3 is a diagrammatic view of a propagating portion of the light guide body of FIG. 1.

FIG. 4 is a diagrammatic view of an out-coupling portion of the light guide body of FIG. 1.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 11:
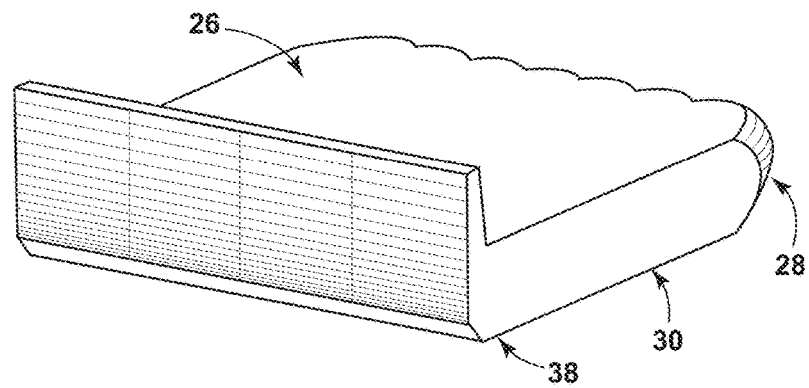
FIG. 11 is an isometric view of the light guide body of FIG. 1.

Referring now to the drawings wherein like reference numerals are used to identify identical or similar components in the various views, FIG. 1 is a diagrammatic view of a lighting device 20 in accordance with an embodiment. The lighting device 20 includes a light source 22 generating light 24 and a light guide body 26. The light source 22 is configured to output light 24, which is diagrammatically represented in FIG. 1 as including a first portion $24_1$ and a second portion $24_2$. The light guide body 26 is configured to collect the light from the light source 22 and guide the light to an exterior surface of the light guide body 26, where the light is emitted in a desired, first direction 54. FIG. 11 is an isometric view of the light guide body 26 of FIG. 1.

With continued reference to FIGS. 1 and 11, the light guide body 26 includes an in-coupling portion 28, a light propagating portion 30, and an out-coupling portion 38. In an embodiment, the light guide body 26 may be generally L-shaped and of unitary construction, and may comprise light transmissive material, such as acrylic or polycarbonate, polyarylate, glass, or polyoxymethylene to mention a few alternatives.

The light guide body 26 may be formed in conventional ways known in the art, such as by a single shot injection molding process. From a manufacturing point of view, the single shot molding process can result in reduced cycle times, material, and machine footprint. Additionally, the unitary construction simplifies the assembly process due to the reduction of the number of components required to be assembled. Further, the unitary construction also reduces and/or eliminates the need to maintain dimensional tolerances of and between various component parts, thereby resulting in a more robust design.

With reference to FIGS. 1 and 11, the in-coupling portion 28 is optically coupled to the light source 22 and is configured to collect the light that is output from the light source 22. The propagating portion 30 extends along a longitudinal axis 32 between a proximal end 34 and a distal end 36. The propagating portion 30 is configured to receive light from the in-coupling portion 28 at the proximal end 34 thereof and then guide the light 24 to the distal end 36 thereof. The out-coupling portion 38 is configured to receive at least the first and second portions $24_1$ and $24_2$ of light from the propagating section 30 and then to emit, in a first direction 54, the first and second portions $24_1$ and $24_2$ of light by way of a light emitting area, which will be described in greater detail below.

FIG. 2 is diagrammatic view of the light source 22 and the in-coupling portion 28. The light source 22 may comprise a circuit board 56 on which is disposed at least one light source such as a light emitting diode (LED) 58 or the like that has a primary direction 60 of light emission directed towards the in-coupling portion 28. In further embodiments, the light source 22 may comprise an incandescent lamp, a high-intensity discharge (HID) lighting element, or a laser. The light source 22 may comprise, in still further embodiments, other conventional lighting sources now known or hereinafter develop, such as organic light-emitting diode (OLED), modular light sources, liquid crystal display (LCD), thin-film transistor (TFT) type LCD, or other display technologies.

In the illustrated embodiment, the primary direction 60 of light emission is generally parallel to the main longitudinal axis 32 of the lighting device 20.

Figure 12:
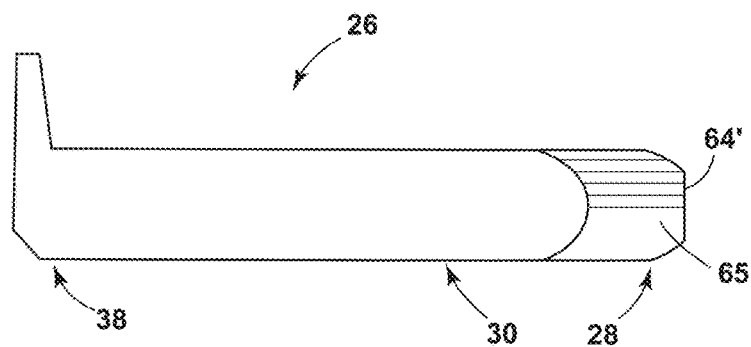
FIG. 12 is a side view of the light guide body of FIG. 11.

The in-coupling portion 28 includes a geometry configured to collect the light output from the light source 22 and guide the collected light in the first direction 54 along the longitudinal axis 32. As shown, the in-coupling portion 28 may comprise a convex-shaped optical structure 62 including a recessed element 63 configured to improve light collection. As shown, the light source 22 faces an apex 64 of the optical structure 62. As shown in greater detail in FIG. 12, the apex 64 may comprise a planar land 64' thereby forming a truncated convex optical structure 28. The planar land 64' is configured to permit light to enter into the in-coupling portion 28, while the curved outer surface, designated by reference numeral 65 in FIG. 12, is configured to inhibit light from emerging from the in-coupling portion 28.

The recessed element 63 is composed of two main elements, the side wall and the top wall. The former enables the light coming from the light source 58 to more efficiently interact with the optical structure 62 while the latter directs the light towards the reflective element 50 to maximize the light traveling towards section 38. The shape of both elements (i.e., the side wall and the top wall) can be, for example only, flat or curved (convex or concave), a symmetric shape or an asymmetric profile.

In other embodiments, the optical structure 62 may comprise a light collecting lens element, a total internal reflection (TIR) reflector or other light gathering and directing structures and/or elements known in the art. Surface/land 64' can be finished in conventional ways known in the art so as to allow the light from the light source to be coupled into the in-coupling and outer surface 65 can be finished in conventional ways known in the art so that light does not escape. In an embodiment, depending on the efficiency desired, surface/land 64' can be highly polished, textured, stippled, ribbed, or laser etched. In regards to surface 65, the finishing can be the same than for surface 64.

Figure 14:
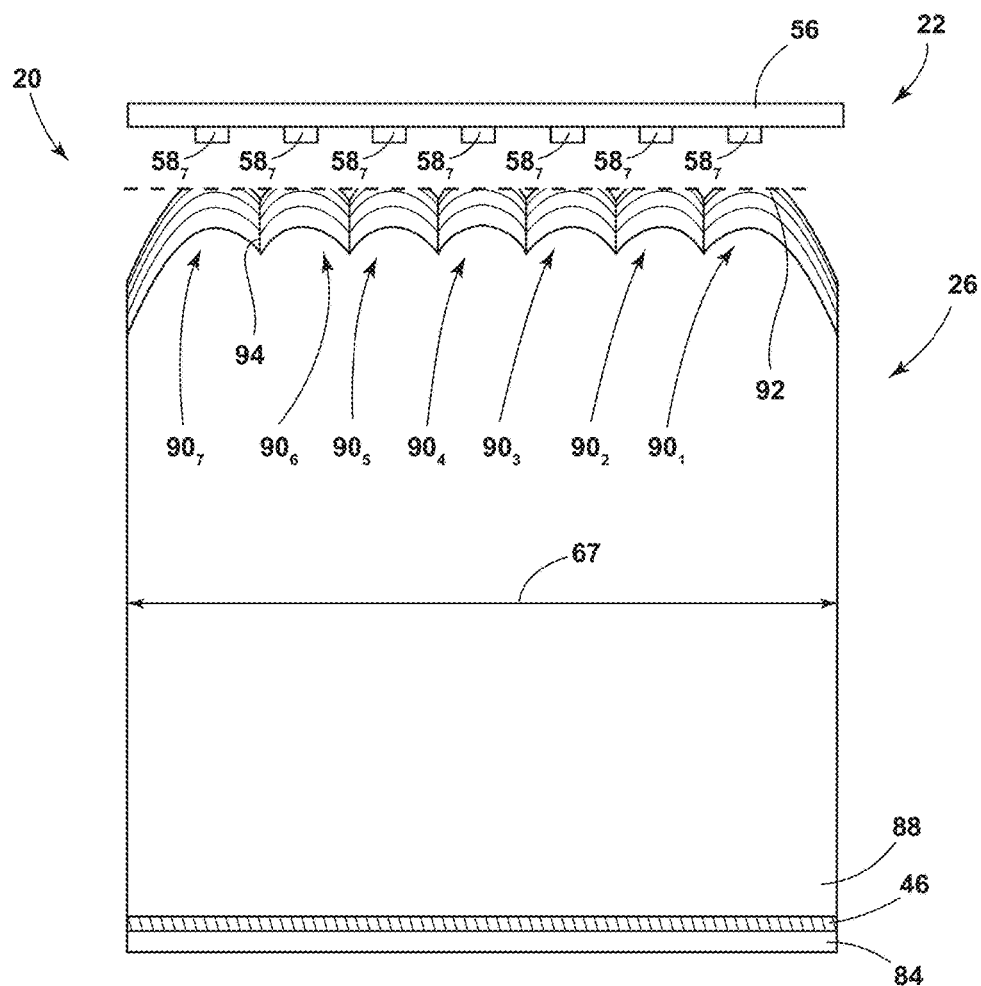
FIG. 14 is a top view of the light guide body of FIG. 11.

As shown in greater detail in FIG. 14, in an embodiment, the light source 22 may include the above-mentioned board 56 as well as a plurality of individual lights sources such as a plurality of LEDs, such light sources/LEDs being designated as $58_1$, $58_2$, $58_3$, $58_4$, $58_5$, $58_6$, and $58_7$. The light guide body 26 includes a linear arrangement of a plurality of truncated generally convex optical structures, designated $90_1$, $90_2$, $90_3$, $90_4$, $90_5$, $90_6$, and $90_7$. Each of the optical structures is generally the same as optical structure 62 described above, and includes a respective planar land 92 and curved exterior surface. Adjacent convex optical structures $90_1$, $90_2$, $90_3$, $90_4$, $90_5$, $90_6$, and $90_7$ meet to form separate intervening valleys 94. Each of the light sources/LED's $58_1$, $58_2$, $58_3$, $58_4$, $58_5$, $58_6$, and $58_7$ respectively face a corresponding one of the plurality of convex optical structures $90_1$, $90_2$, $90_3$, $90_4$, $90_5$, $90_6$, and $90_7$ such that a primary direction 60 of light emission from the light sources/LEDs is directed towards the respective convex optical structures $90_1$, $90_2$, $90_3$, $90_4$, $90_5$, $90_6$, and $90_7$. It should be understood that other light source arrangements can be used. For example only, the light sources can be arranged in a linear pattern, a jigsaw pattern, a matrix pattern or even a module with a remote light source. Through the foregoing, substantially continuous light source can be provided to the in-coupling portion 28, as taken with respect to a direction transverse to the main axis 32.

FIG. 3 is a diagrammatic view of the propagating portion 30 of the light guide body 26, which may comprise a generally rectangular plate. As described above, the propagating portion 30 is configured to receive light from the in-coupling portion 28 at the proximal end 34 and allow the collected light to propagate to the distal end 36. In an illustrated embodiment, where the light guide body 26 is unitary, the continuous nature of the optical material used in light guide body 26 allows light from the in-coupling portion 28 to pass and enter the proximal end 34 and propagate to the distal end 36. The top surface (best shown as surface 88 in FIG. 14), the bottom surface, and both of the side surfaces that define the exterior surfaces of the propagating portion 30 are configured so as to inhibit light emerging from the interior of the propagating portion 30. In an embodiment, the exterior surfaces of the propagating portion 30 may be treated so as to limit light from escaping, for example, preferably, by preparing such exterior surfaces so as to have a highly polished material/finish. Alternatively, to limit light from escaping, the exterior surfaces of the propagating portion 30 may be coated with a special coating(s), such as metallic and/or polymeric coatings.

In addition, the cross-sectional area of the propagating portion 30, which in the illustrated rectangular-shape embodiment, is defined by a height 66 and a width 67 (best shown in FIG. 14). It should be mentioned that the cross-sectional area of the propagating portion 30 is reduced relative to the total light emitting area of the out-coupling portion 38. This allows for a relatively thin propagating portion 30 while still achieving the minimum light emitting area.

FIG. 4 is a diagrammatic view of the out-coupling portion 38 of the light guide body 26. The out-coupling portion 38 is generally proximate to the distal end 36 of the propagating portion 30. The out-coupling portion 38 is configured to provide a light emitting area that is increased relative to the cross-sectional area of the propagating portion 30 to which it is optically coupled. The out-coupling portion 38 will be described below in greater detail with reference to FIGS. 5-8.

Figure 5:
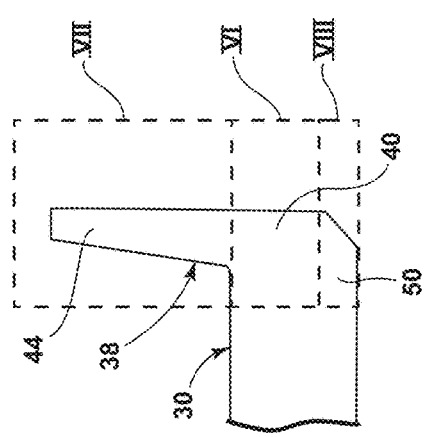
FIG. 5 is an enlarged view of the out-coupling portion of FIG. 4 showing a central light emitting portion, an extended light emitting portion, and a deflecting element.

FIG. 5 is an enlarged view of the out-coupling portion 38, which includes a central light emitting portion 40, an extended light emitting portion 44, and a deflecting element 50. Elements 40, 44, 50 will be described in turn.

Figure 6:
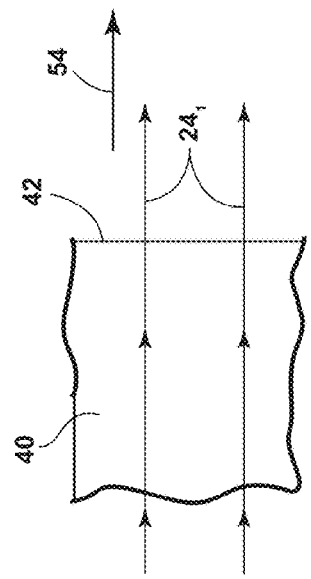
FIG. 6 is an enlarged view of the central light emitting portion shown in FIG. 5.

FIG. 6 is a diagrammatic view of the central light emitting portion 40, as broken-away from the out-coupling portion 38. The central light emitting portion 40 is proximate to the distal end 36 of the propagating portion 30 and includes a central exterior surface 42, whose area defines a first, central light emitting area 72 (see FIG. 13). The central light emitting portion 40 is configured generally to guide the first portion $24_1$ of light emerging from the propagating portion 30 to the central exterior surface 42, whereby the first portion $24_1$ of light is emitted in the first direction 54. The central exterior surface 42 may comprise various approaches known in the art configured to permit light to be emitted therefrom. For example, the central exterior surface 42 may comprise a predetermined light emitting arrangement selected from the group comprising one or more lenses, micro-optics, and textures. In an embodiment, the central exterior surface 42—as an emitting surface—is configured to allow the efficient emission of light. In this regard, the central exterior surface 42 may be prepared in any of several ways known in the art for this purpose, such as by being highly polished, textured, stippled, ribbed, laser etched, or the like.

Figure 7:
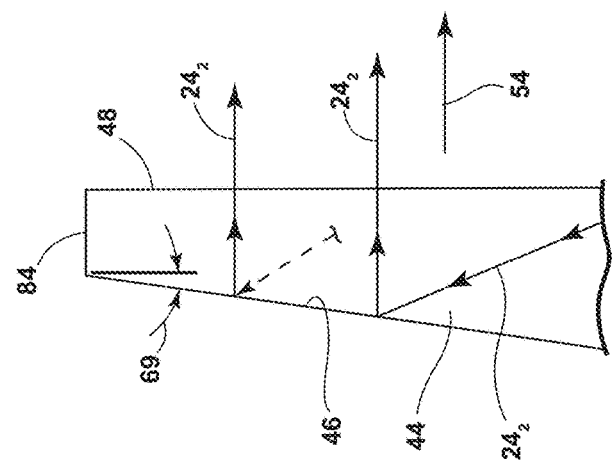
FIG. 7 is an enlarged view of the extended light emitting portion shown in FIG. 5.

FIG. 7 is a diagrammatic view of the extended light emitting portion 44, which includes a proximal reflecting surface 46, an extended exterior surface 48, whose area defines a second, extended light emitting area 74 (FIG. 13), and a top surface 84 (also shown in FIG. 14). The extended light emitting portion 44 is configured generally to guide the second portion $24_2$ of light from the deflecting element 50 (described below in connection with FIG. 8) to the extended exterior surface 48. The second portion $24_2$ of the light is then emitted generally from the extended exterior surface 48 in the first direction 54. The extended exterior surface 48 may comprises the same light emitting arrangement as used for the central light emitting surface 42, and in an embodiment, the light emitting arrangement may be the same.

In the illustrated embodiment, the extended light emitting portion 44 guides the second portion $24_2$ of light by way of the reflecting surface 46 that is disposed at a predetermined angle 69 relative to a normal line (as shown). The second portion $24_2$ of light is emitted by way of the exterior surface 48—emitted in the first direction 54. The proximal reflecting surface 46 may comprise conventional approaches for implementing a reflecting surface or otherwise reflecting the second portion $24_2$ of light to direct light $24_2$ in the first direction 54. In this regard, the extended light emitting portion 44 may comprise one or more of the following to achieve the above-described functions, including prismatic optical element(s), cylindrical optical element(s), pillows, patterns, micro-optics, printed structures, an optical coating configured to reflect light, and an optical coating configured to facilitate transmission/emission of light. The top surface 84 may be configured to inhibit light from emerging, through conventional means. In particular, the surface 46 may be a highly polished optical elements, suited to its function of reflecting light rays as described above, while surface 84 may comprise a light absorbing material, such as another layer of black material, a black stamping, or any type of light absorbing coating.

Figure 8:
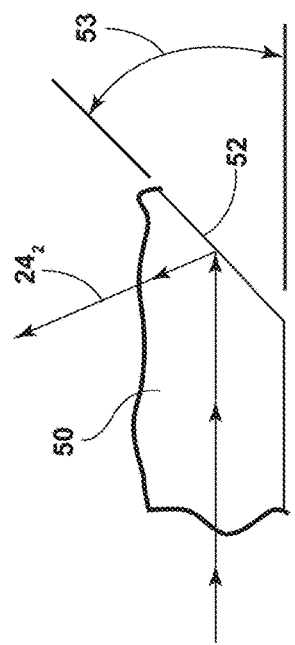
FIG. 8 is an enlarged view of the deflecting element shown in FIG. 5.

FIG. 8 is a diagrammatic view of the deflecting element 50 of FIG. 5. The deflecting element 50 is disposed proximate to the distal end 36 of the propagating portion 30 and is configured generally to guide the second portion $24_2$ of light that is propagating in the first direction 54 (through propagating portion 30) to the proximal reflecting surface 46. The deflecting element 50 may comprise an optical element having a distal reflecting surface 52 arranged at a predetermined angle 53 relative to a bottom surface of the deflecting element 50. The distal reflecting surface 52 may be configured in ways known in the art to form a reflective surface. For example only, surface 52 may comprise a highly polished surface or coated with a reflective film.

Figure 13:
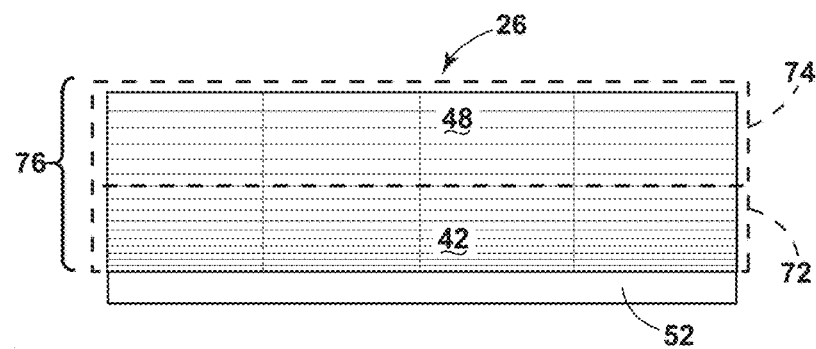
FIG. 13 is a front view of the light guide body of FIG. 11.

Referring now to FIGS. 6-7 and 13, it should be appreciated that the central exterior surface 42 forms the first central light emitting area 72 and that the extended exterior surface 48 forms the second extended light emitting area 74. Further, it should be noted that the total light emitting area 76 is the sum of the areas 72, 74. Further note that this result is accomplished using a reduced cross-sectional area propagating portion 30 (i.e., reduced relative to total light emitting area 76). This relationship allows for a lighting device that can meet the minimum light emitting area standards, while using a relatively thin configuration. For example, the light propagating portion 30 does not have to be as thick or otherwise have a cross-sectional area just as large as the desired light emitting area. Additionally, the light guide body 26, having an extended light emitting area 74 in addition to a central light emitting area 72, results in a total light emitting area 76 that can meet the minimum light emitting area without the need for additional optical elements.

Figure 9:
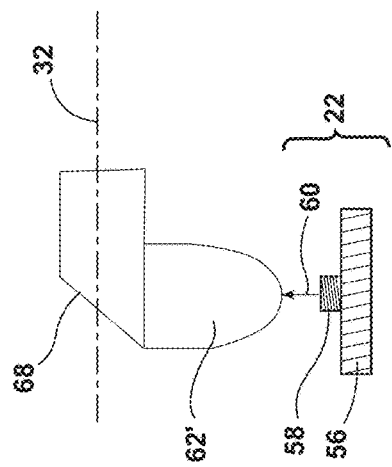
FIG. 9 is a diagrammatic view of a first alternate embodiment of the in-coupling portion of FIG. 2.

FIG. 9 is a diagrammatic view of a first alternate embodiment of the convex-shaped optical structure 28, which comprises an elbow-shaped optical element, designated element 62'. The optical element 62' is disposed relative to the light source 22, such that the primary direction 60 of light emission from the light source 22 is substantially perpendicular to the main longitudinal axis 32. The optical element 62' is configured to include a reflective surface 68 configured to reflect the light emitted in the primary direction 60 from the source 22. The light beams 24, after reflection, then propagate generally in the first direction 54 along the main axis 32. The optical element 62' may comprise conventional construction approaches to achieve this function, such as by suitable selection of an optical construction and/or materials for the reflective surface 68. For example only, optical element 62' may be constructed in a manner similar to that of optical element 62, but at a different angle wherein such angle will control the shape and angle of reflective surface 68. The foregoing is based on total internal reflection (TIR) design, as known generally in the art.

Figure 10:
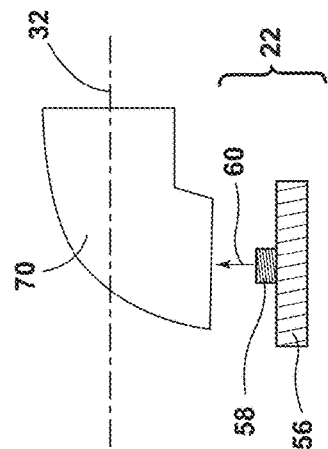
FIG. 10 is a diagrammatic view of a second alternate embodiment of the in-coupling portion of FIG. 2.

FIG. 10 is a diagrammatic view of a second alternate embodiment of the in-coupling portion 28, which comprises an elbow-shaped optical element, designated element 70. Optical element 70 is disposed relative to the light source 22, such that the primary direction 60 of light emission from the light source 22 is substantially perpendicular to the main longitudinal axis 32. The optical element 70 is configured to guide or bend the light emitted from source 22 such that the light beams 24, after bending, then propagate generally in the first direction 54 along the main axis 32. The optical element 70 may comprise conventional construction approaches to achieve this function, such as by suitable selection of optical construction and/or materials (e.g., refractive index) or the like.

It should be understood that while FIGS. 2 and 9-10 show the primary direction 60 of light emission to be parallel and perpendicular to the main longitudinal axis 32, still other variations are possible. In this regard, the primary direction 60 of light emission may be angled, for example, between 0 degrees and 90 degrees from the main longitudinal axis 32. Optical element 70 may be constructed according to total internal reflection (TIR) design, as known generally in the art.

Figure 15:
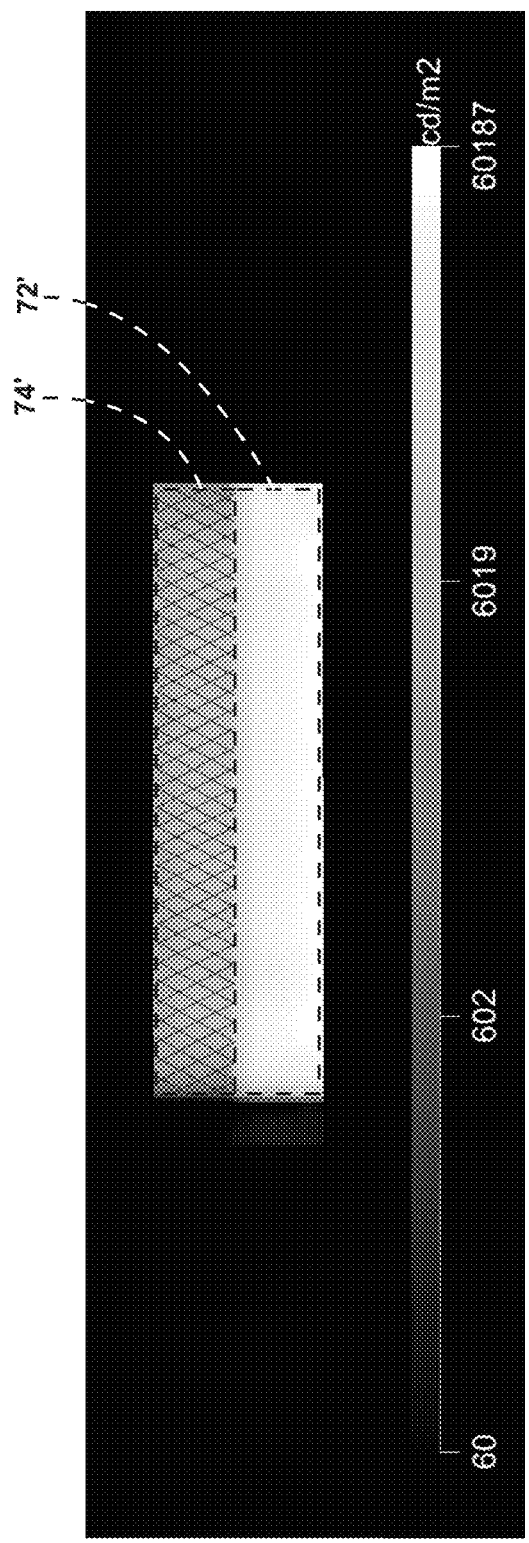
FIG. 15 is a luminance plot of the lighting device of FIG. 11, showing a central light emitting area and an additional extended light emitting area.

FIG. 15 is a luminance plot of an embodiment of the lighting device 20 consistent with the present teachings. The luminance plot shows the output luminance for the first, central light emitting area 72 and the second, extended light emitting area 74. For convenience, the corresponding areas on the luminance plot are designated 72', 74'. Note that the light emitting area 72 exhibits an increased light intensity compared to the light emitting area 74. The light emitted from the central exterior surface (area 72') may be used to generate the light distribution needed to fulfill lighting regulations (e.g., test point values). The addition of the second, extended light emitting area (area 74') to the first, central light emitting area assures that the total light emitting area meets the minimum light emitting area requirements.

Figure 16:
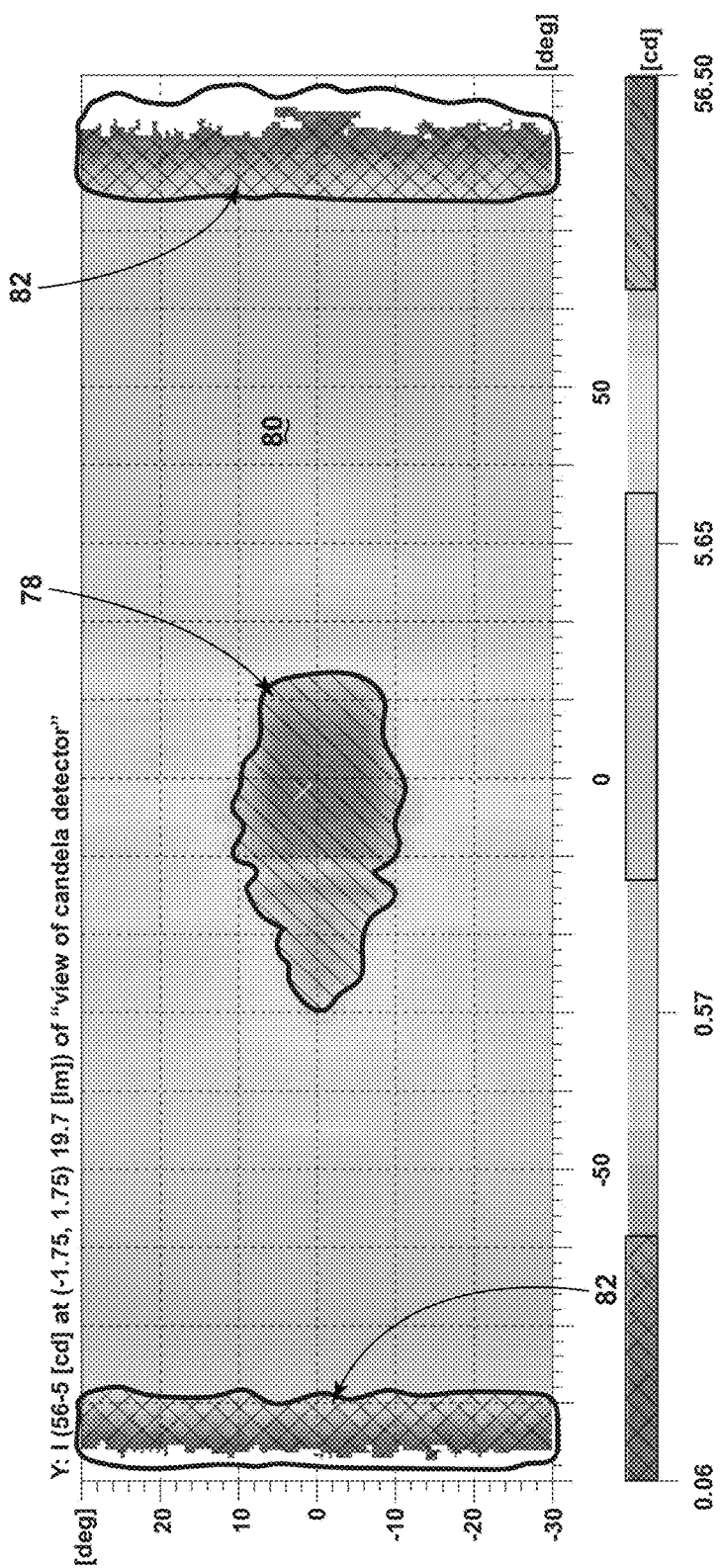
FIG. 16 is a light intensity plot showing light intensity as a function of viewing angle.

FIG. 16 is a light intensity plot showing light intensity as a function of on-axis and off-axis measurements, which illustrates the light distribution of an embodiment of the instant teachings. As shown, the X-axis pertains to the number of degrees (horizontal) off of center-axis, while the Y-axis pertains to the number of degrees (vertical) off of center-axis. The plot in FIG. 16 illustrates light uniformity as measured on-axis and as measured progressively off-axis.

A first region 78 shows a first (highest) level of light intensity for substantially on-axis measurement (i.e., the region being roughly between ±20 horizontal degrees and ±10 vertical degrees). A second region 80 shows a second, reduced level of light intensity that extends from the first region 78 and continues to about ±70-80 degrees (horizontal). A third region 82 extends further off-axis (horizontal) from the second region 80. The third region 82 is nearly perpendicular to the exterior face of the lighting device.

It should be understood that while in disclosed embodiment, the instant teachings were applied to stop and/or signal lighting, variations are possible. For example, the instant teachings may be used in a variety of lighting applications, including in a variety of automotive lighting applications such as stop, rear turn, front turn, daytime running lamp, front position, side marker, side turn indicator, signature lights, or interior lighting applications such as map lights, reading lamps, instrument clusters, doors, or seats, and the like.

Although only certain embodiments have been described above with a certain degree of particularity, those skilled in the art could make numerous alterations to the disclosed embodiments without departing from the scope of this disclosure. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A lighting device for an automotive vehicle, comprising:
   a light source configured to output light; and
   a light guide body including,
   an in-coupling portion optically coupled to said light source and configured to collect light that is output from said light source;
   a propagating portion extending along a longitudinal axis between a proximal end and a distal end, said propagating portion being configured to receive light from said in-coupling portion at said proximal end and guide light to said distal end;
   an out-coupling portion including a central light emitting portion having a central exterior surface, an extended light emitting portion having a proximal reflecting surface and an extended exterior surface, and a deflecting element,
   wherein said central light emitting portion is proximate distal end of said propagating portion and is configured to guide a first portion of said light to said central exterior surface to emit said first portion of light in a first direction;
   wherein said deflecting element is proximate said distal end of said propagating portion and is configured to guide a second portion of said light that is propagating in said first direction to said proximal reflecting surface of said extended light emitting portion; and
   wherein said extended light emitting portion is configured to guide said second portion of light reflected from said proximal reflecting surface to said extended exterior surface to emit said second portion of light in said first direction; and
   wherein said central exterior surface and said extended exterior surface are configured to allow light to be emitted therefrom in said first direction using the same predetermined lighting arrangement, and wherein said central exterior and extended exterior surfaces are adjacent and non-overlapping.

2. The lighting device of claim 1 wherein said light source comprises one of a light-emitting diode (LED), an incandescent lamp, a high-intensity discharge (HID) lighting element, and a laser.

3. The lighting device of claim 1 wherein said light guide body is unitary.

4. The lighting device of claim 1 wherein said in-coupling portion comprises a geometry configured to collect said light output from said light source and to guide said collected light generally in said first direction along said axis.

5. The lighting device of claim 4 wherein said in-coupling portion comprises a truncated convex structure having a planar land and wherein said light source faces said land.

6. The lighting device of claim 4 wherein said light source has a primary direction of emission that is generally parallel to said axis of said propagating portion.

7. The lighting device of claim 4 wherein said light source has a primary direction of emission that is one of perpendicular and angled relative to said axis of said propagating portion.

8. The lighting device of claim 6 wherein said in-coupling portion comprises a total internal reflection (TIR) reflector.

9. The lighting device of claim 6 wherein said in-coupling portion comprises one of (i) an elbow-shaped optical element configured to guide said light emitted in said primary direction of emission to said first direction generally parallel to said axis of said propagating portion; and (ii) an elbow-shaped optical element having a reflective surface configured to reflect said light emitted in said primary direction of emission to said first direction generally parallel to said axis of said propagating portion.

10. The lighting device of claim 1 wherein said deflecting element comprises a prismatic element having a predetermined angle that defines a distal reflecting surface configured to reflect said second portion of said light to said proximal reflecting of said extended light emitting portion.

11. The lighting device of claim 1 wherein said central exterior surface comprises a first area and said extended exterior surface comprises a second area, wherein a sum of said first and second areas is equal to or exceeds a predetermined minimum light emitting area.

12. The lighting device of claim 11 wherein said predetermined minimum light emitting area comprises about 50 square centimeters.

13. The lighting device of claim 11 wherein said sum of said first and second areas is greater than a cross-sectional area of said propagating portion.

14. The lighting device of claim 11 wherein a distribution of said first portion of said light emitted from said central exterior surface conforms to predetermined minimum light intensity and uniformity levels.

15. The lighting device of claim 11 wherein said extended light emitting portion comprises one of a prismatic optical element, a cylindrical optical element, pillows, patterns, micro-optics, printed structures, an optical coating configured to reflect light, and an optical coating configured to facilitate emission of light.

16. The lighting device of claim 1 wherein said light guide body comprises a light transmissive material selected from the group comprising acrylic and polycarbonate.

17. The lighting device of claim 1 wherein said in-coupling portion comprises a linear arrangement of a plurality of truncated generally convex structures, and further comprising a plurality of lights sources wherein each of said light sources face a respective one of said plurality of convex structures, and wherein said propagating portion comprising a rectangular-shaped plate.

18. The lighting device of claim 1 wherein said extended light emitting portion has a top surface that is opaque and configured to inhibit light exiting said extended light emitting portion.

19. A lighting device for an automotive vehicle, comprising:
   a linear arrangement of a plurality of light sources configured to output light; and
   a unitary, generally L-shaped light guide body including,
   an in-coupling portion comprising a continuous linear arrangement of a plurality of optical structures that are optically coupled to said linear arrangement of said plurality of light sources wherein each light source faces a respective one of said plurality of optical structures in said unitary light guide body and is configured to collect light that is output from said plurality of light sources;
   a propagating portion extending along a longitudinal axis between a proximal end and a distal end, said propagating portion being configured to
   receive light from said in-coupling portion at said proximal end and guide light to said distal end;

an out-coupling portion including a central light emitting portion having a central exterior surface, an extended light emitting portion having a proximal reflecting surface and an extended exterior surface, and a deflecting element, wherein said central light emitting portion is proximate said distal end of said propagating portion and is configured to guide a first portion of said light to said central exterior surface to emit said first portion of light in a first direction;

wherein said deflecting element is proximate said distal end of said propagating portion and is configured to guide a second portion of said light that is propagating in said first direction to said proximal reflecting surface of said extended light emitting portion;

wherein said extended light emitting portion is configured to guide said second portion of light reflected from said proximal reflecting surface to said extended exterior surface to emit said second portion of light in said first direction; and wherein said central exterior surface and said extended exterior surface are configured to allow light to be emitted therefrom in said first direction using the same predetermined lighting arrangement, and wherein said central exterior and extended exterior surfaces are adjacent and non-overlapping.

* * * * *